United States Patent [19]

Isoyama et al.

[11] 4,353,388
[45] Oct. 12, 1982

[54] BUTTERFLY VALVE

[75] Inventors: Mitsunori Isoyama, Hirakata; Susumu Takeda, Amagasaki; Masatoshi Nakai, Hirakata all of Japan

[73] Assignee: Kubota, Ltd., Osaka, Japan

[21] Appl. No.: 167,021

[22] Filed: Jul. 9, 1980

[30] Foreign Application Priority Data

Jul. 12, 1979 [JP] Japan .................................. 54-88847
Jul. 17, 1979 [JP] Japan .................................. 54-91080

[51] Int. Cl.³ ............................................ F16K 49/00
[52] U.S. Cl. .................................... 137/240; 137/340; 251/214; 277/22; 277/59
[58] Field of Search ................ 137/340, 240; 251/305, 251/306, 214; 277/59, 19, 22

[56] References Cited

U.S. PATENT DOCUMENTS

| | | | |
|---|---|---|---|
| 2,705,016 | 3/1955 | Saar | 137/340 |
| 2,811,981 | 11/1957 | Harris | 137/340 |
| 2,956,824 | 10/1960 | Kuchler et al. | 277/22 |
| 3,021,146 | 2/1962 | Sommer et al. | 277/59 |
| 3,325,173 | 6/1967 | Alt | 277/59 |
| 3,377,073 | 4/1968 | Harney | 277/59 |
| 3,474,734 | 10/1969 | Stogner | 277/59 |

*Primary Examiner*—A. Michael Chambers
*Attorney, Agent, or Firm*—Cushman, Darby & Cushman

[57] ABSTRACT

This invention provides a butterfly valve in which gland packing portions for preventing fluid leakage are provided between a valve stem carrying a valve closure member rotatable in a valve housing and tubular portions of the housing receiving the stem, and bearing portions for the stem are disposed outwardly of the gland packing portions. Each of the gland packing portions is divided into two sections between which a bearing member is provided to support the stem. Thus the stem is supported by the bearing portions and the bearing members.

7 Claims, 6 Drawing Figures

BUTTERFLY VALVE

BACKGROUND OF THE INVENTION

(1) Field of the Invention

This invention relates to a butterfly valve comprising a valve housing having tubular portions, a valve stem extending in the tubular portions and carrying a valve closure member rotatable in the valve housing, gland packing portions provided between the stem and the tubular portions to prevent fluid leakage, and bearing portions for the valve stem provided outwardly of the gland packing portions respectively.

(2) Description of the Prior Art

This type of butterfly valve is suitable for use on a pipeline for transmitting high temperature and high pressure fluid such as exhaust gas resulting from combustion, and generally has bearing portions for the valve stem disposed outwardly of gland packing portions to avoid sticking due to the heat of the fluid. Since the bearing portions are far apart, the valve stem flexes a great deal under the fluid pressure acting on the valve closure member when the valve is completely closed, which results in bad sealing. It has been proposed to provide a large diameter stem to reduce the flexion, but this has a disadvantage of leaving a small opening area when the valve is fully open and deteriorating flow characteristic.

SUMMARY OF THE INVENTION

In view of the above-noted state of the art, the object of this invention is to provide a butterfly valve free from sticking at the bearing portions and from an inconvenient flexion of the stem under fluid pressure without requiring the stem to have a large diameter.

To this end, the butterfly valve according to this invention comprises a valve housing having tubular portions, a valve stem extending in the tubular portions and carrying a valve closure member rotatable in the valve housing, gland packing portions provided between the stem and the tubular portions to prevent fluid leakage, and bearing portions for the valve stem provided outwardly of the gland packing portions respectively, wherein each of the gland packing portions is divided axially of the valve stem into two sections, and a bearing member is fitted between the valve stem and the tubular portion at a position intermediate between the two sections.

The stem is supported not only by the bearing portions but also by the bearing members each fitted between the divided sections of each gland packing portion. Therefore, the divided gland packing portions protect the bearing members from fluid whose heat would otherwise cause their sticking. The valve stem in this invention is supported at closer intervals than in conventional valves, which helps diminish the flexion of the valve stem due to fluid pressure acting on the valve closure member. Thus the invention does not require a large diameter stem, and yet provides excellent sealing and flow characteristic when the valve is completely closed.

DETAILED DESCRIPTION OF THE PREFERRED EMBODIMENTS

Figure 1:
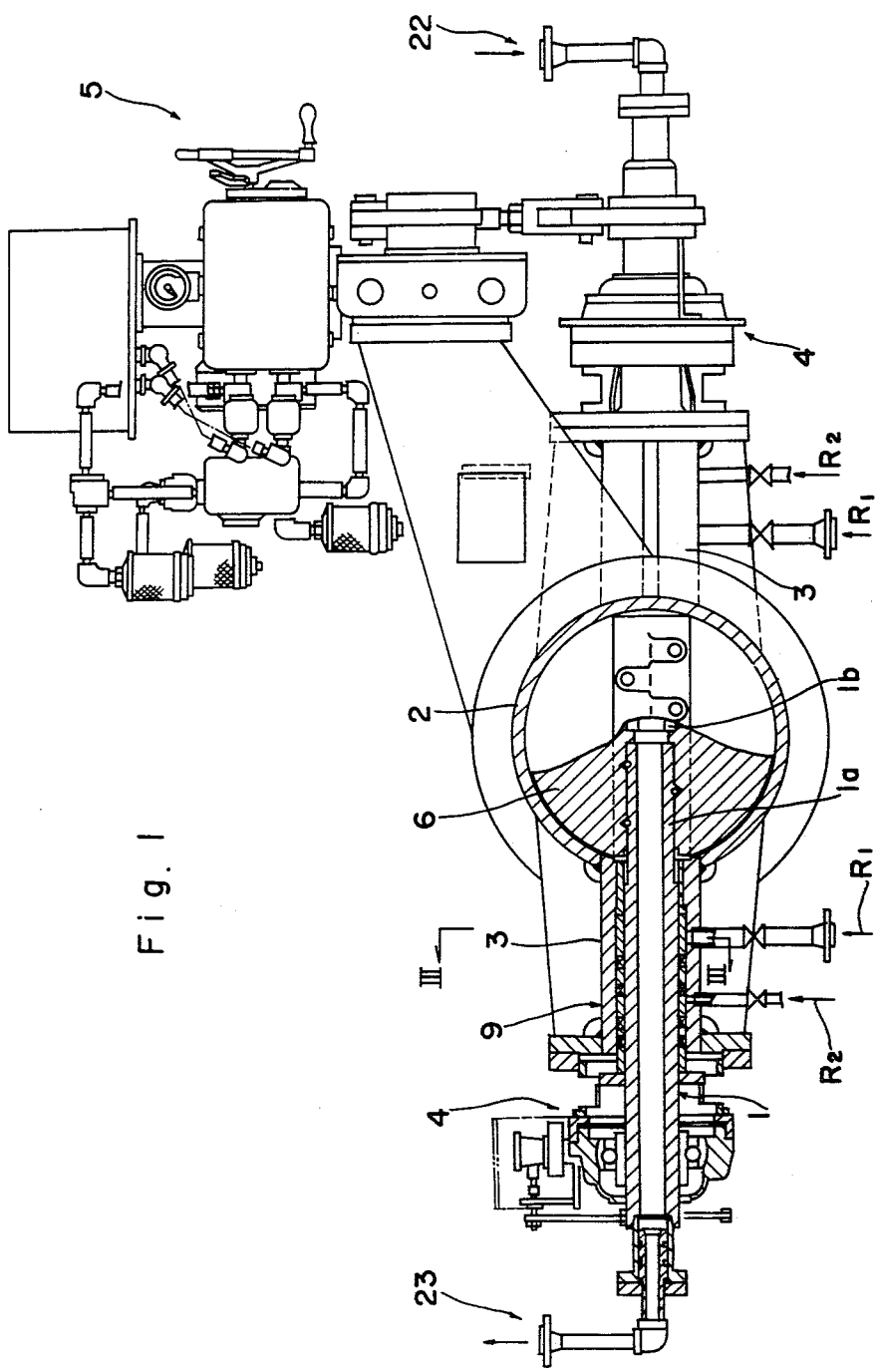
FIG. 1 is a partly sectional view of a butterfly valve according to this invention.
Figure 2:
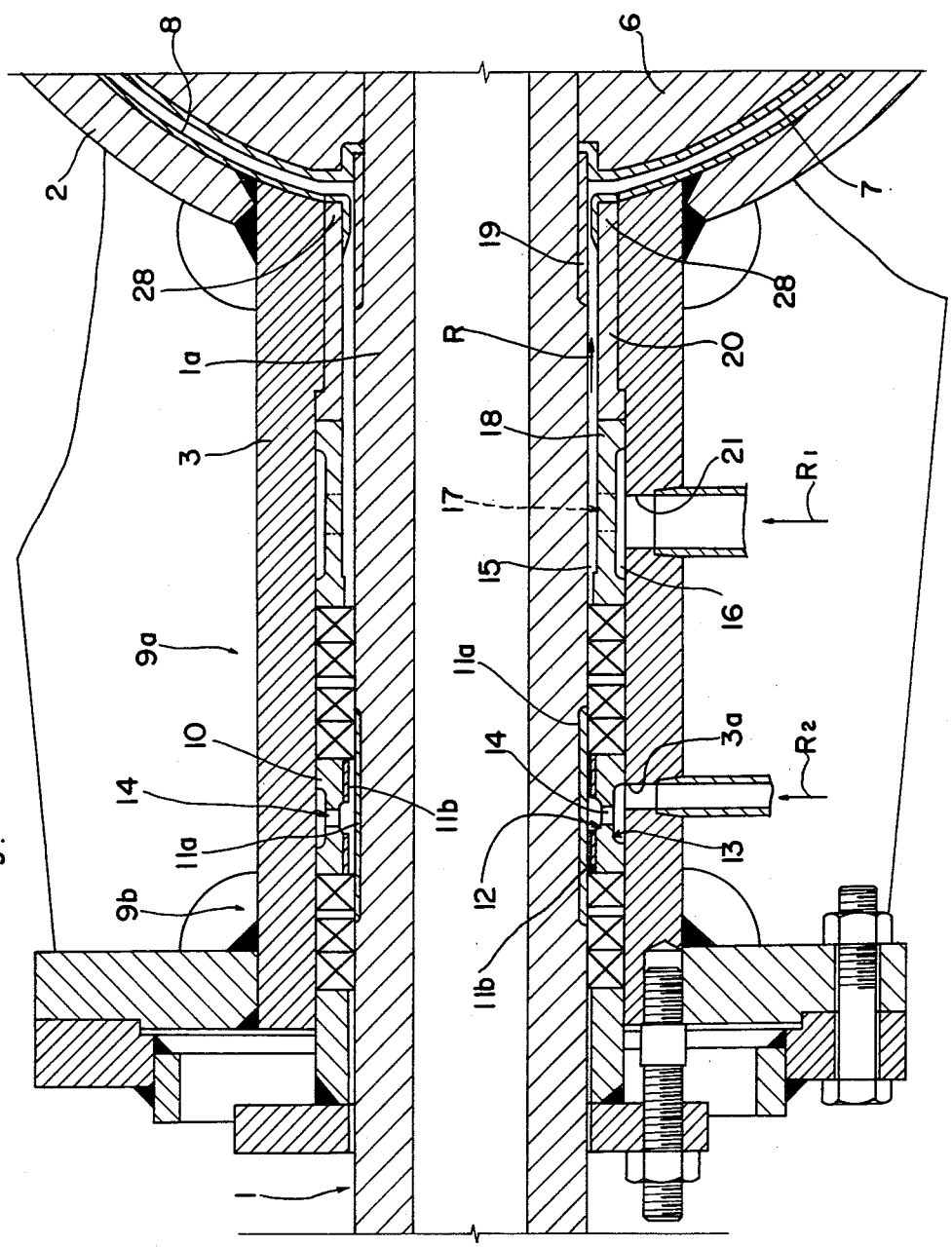
FIG. 2 is an enlarged sectional view of a principal part of the butterfly valve.

Referring to FIG. 1, a valve stem 1 comprises hollow stem portions 1a and 1b respectively extending through tubular portions 3,3 of a valve housing 2 and rotatably supported by bearing portions 4,4 comprising ball bearings. The valve stem 1 carries a valve closure member 6 at its middle position and has one end thereof operatively connected to a valve operating mechanism 5. A rotation of the valve stem 1 causes a seat 7 (FIG. 2) mounted peripherally on the valve closure member 6 to come into or out of press contact with a seat 8 mounted on an inner periphery of the valve housing 2. Gland packing portions 9,9 are provided between the valve stem 1 and each of the tubular portions 3,3 and at a position closer to the valve closure member 6 than is the bearing portion 4. At a position of each of the tubular portions 3,3 closer still to the valve closure member 6 is provided a duct R1 for introducing purge fluid such as steam. The butterfly valve of the above construction is suitable for use on a pipeline for transmitting high temperature and high pressure gas containing dust such as exhaust gas generated in reclamation of zeolite, silica ($SiO_2$) and the like at the time of oil refining.

It is to be noted that the valve stem 1 may comprise a single stem so long as it is hollow.

While FIG. 1 shows one of the tubular portions 3 of the valve housing 2 in section, the two tubular portions 3,3 have substantially the same construction. Therefore, for expediency, only one of the tubular portions 3 is described in detail hereinafter with reference to FIGS. 2–4.

The gland packing portion 9 is divided axially of the valve stem 1 into two sections 9a,9b, and a bearing member 10 is fitted therebetween. Thus, the valve stem 1 is supported by the valve housing 2 at four positions, namely by means of the two bearing portions 4,4 and the two bearing members 10,10.

Beads 11a,11b of stellite or the like are welded to the bearing member 10 at a position to slidingly contact the valve stem 1 at a position opposed to the bearing member 10. The tubular portion 3 has a perforation 3a to which a grease inlet duct R2 is connected, and the bearing member 10 has annular grooves 12,13 defined on its inner and outer peripheries and pores 14 defined at four circumferential positions thereof to communicate with the grooves 12,13, thereby to permit entry of grease to the position at which the valve stem 1 and the bearing member 10 slidingly contact each other. This construction prevents sticking of the valve stem 1 and the bearing member 10, and provides effective sealing at the gland packing portion 9.

For introducing purge fluid, a purge ring 18 having annular grooves 15,16 on inner and outer peripheries thereof and pores 17 defined at six circumferential positions to communicate with the grooves 15,16 is mounted between the tubular portion 3 and the valve stem 1 with the outer groove 16 in communication with the duct R1. The valve stem 1, a collar 19 surrounding the valve stem 1 and a bush 20 fitted against an interior wall of the tubular portion 3 define a space or passage R by which the purge fluid from the duct R1 flows into the valve housing 2 to stop dust short of the gland packing portion 9 and the bearing member 10 and to shut the bearing member 10 away from the heat of the fluid transmitted through the pipeline.

Figure 3:
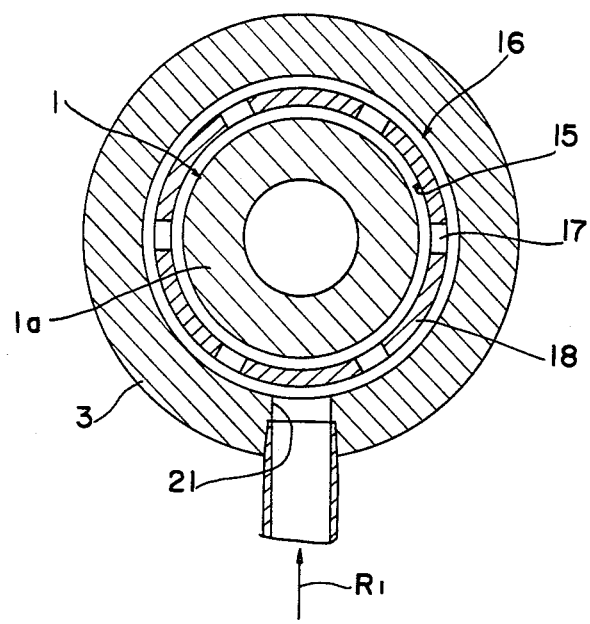
FIG. 3 is a sectional view taken on line III—III of FIG. 1.

FIG. 3 shows how communication is established between the inlet duct R1 and the outer annular groove 16. The tubular portion 3 has a perforation 21 defined at a circumferential position, and the purge ring 18 is inserted such that the outer groove 16 is placed in communication with the perforation 21. The pores 17 of the purge ring 18 are staggered from the perforation 21 whereby the purge fluid flows from the inlet duct R1 through the perforation 21, the annular groove 16 and the pores 17 and then into the passage R in uniform peripheral distribution.

The valve stem 1 is cooled by cooling air flowing through its hollow from an inlet 22 provided at one end to an outlet 23 at the other end thereof.

Figure 4:
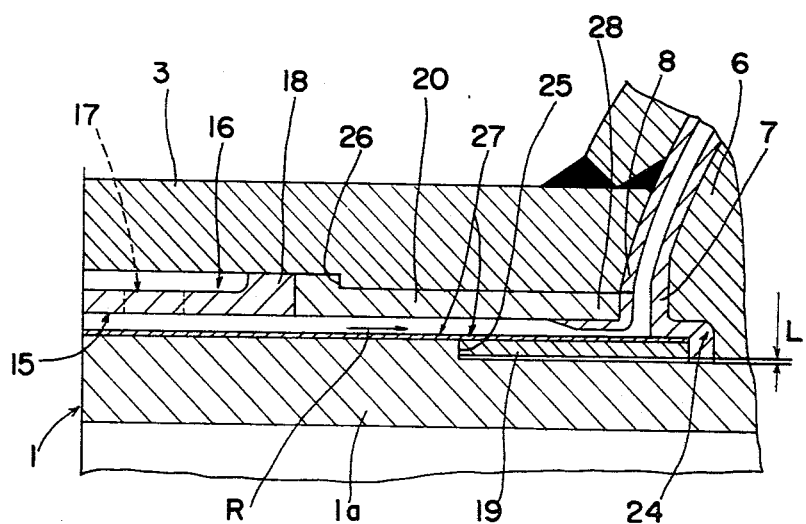
FIG. 4 is an enlarged view of part of FIG. 2.

As shown in FIG. 4, the valve closure member 6 has a recess 24 at a position opposed to the bearing portion 4, and the seat 7 of stellite material bead welded to the valve closure member 6 extends over an outer face of the recess 24. The collar 19 fitted on the valve stem 1 has one end thereof fitting tight into the recess 24 and the other end abutting against a step 25 defined on the valve stem 1, to lock the valve closure member 6 against radial movement. Space L is provided between an inner periphery of the collar 19 and an outer periphery of the stem 1 to protect the stem 1 from dust and purge fluid and to insulate the heat of the transmitted fluid.

The bush 20 is fitted in the tubular portion 3 adjacent to its inwardly opening end 28 and locked against movement toward the valve closure member 6 by a step 26 defined in the tubular portion 3, whereby the tubular portion 3 adjacent to the valve closure member 6 is protected from dust and purge fluid. An inner periphery of the bush 20 adjacent to the valve closure member 6 is coated with an extension of the seat 8 comprising stellite material bead welded to the valve housing 2. This construction renders small the space between the bush 20 and the collar 19 to help prevent entry of dust, and the resulting constriction of the passage R increases the velocity of purge fluid to provide effective removal of dust. This construction also protects the end of the bush 20 adjacent to the valve closure member 6 against erosion due to the increased fluid velocity.

The collar 19 and the valve stem 1 are lined on the surfaces opposed to the passage R with a metal film such as of tungsten carbide or the like which is strong against high temperature and wear. Thus the valve stem 1 and the collar 19 are protected against erosion by the purge fluid.

The number of the pores 17 defined in the purge ring 18 does not have to be six. Any plural number such as three or four will serve the purpose so long as the pores 17 are circumferentially distributed.

Figure 5:
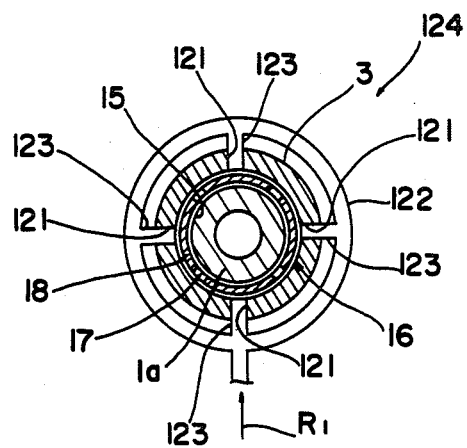
FIG. 5 is a sectional view of a modified inlet duct for purge fluid.

The inlet duct R1 and the outer groove 16 may be placed in communication in a modified manner as illustrated in FIG. 5. In this embodiment, the tubular portion 3 has pores 121 defined circumferentially at a phase angle of 90 degrees with one another, and a distributor pipe 124 is provided having an annular pipe portion 122 and branch pipe portions 123 in communication with the annular pipe portion 122 and the pores 121, whereby the purge fluid is fed into the outer groove 16 in uniform peripheral distribution. The purge ring 18 is fitted in the tubular portion 3 with its pores 17 at a phase angle of 45 degrees with the pores 121 of the tubular portion 3 to facilitate uniform peripheral distribution about the stem 1 of the purge fluid flowing toward the valve housing 2.

Next, correlation between jet velocity V of the purge fluid flowing through the passage R and temperature T of the valve stem 1 is described in detail on the basis of test results. In the tests the fluid transmitted through the valve housing 2 was at 700° C. and steam used as the purge fluid was at 150° C.

Figure 6:
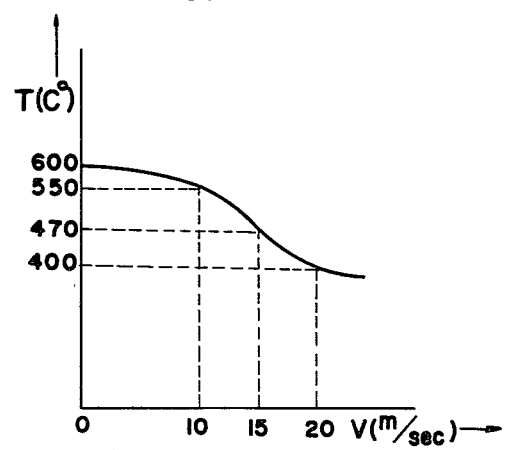
FIG. 6 is a graph showing correlation between the jet velocity of the purge fluid and the temperature of the valve stem.

As shown in FIG. 6, when no purge fluid is supplied, the stem 1 is cooled only by cooling air flowing through its hollow and the stem temperature is about 600° C. The stem temperature drops as the jet velocity V gradually increases. There occurs little change up to the velocity V of 10 m/sec. where the stem temperature drops only to about 550° C. A considerable change is noted in the vicinity of 15 m/sec. at which the stem temperature drops to about 470° C. Then the stem temperature further drops to about 400° C. at the velocity 20 m/sec. When the fluid velocity is in excess of 20 m/sec. the temperature drop becomes small again, and it lowers only to about 380° C. at the velocity 30 m/sec. The above findings clearly show that the valve stem 1 is most efficiently cooled by providing the purge fluid at a jet velocity of 15 m/sec. or higher.

However, where the purge fluid is at a velocity of 50 m/sec. or higher, there could arise a problem of erosion by the purge fluid. It is therefore desirable to determine the jet velocity of the purge fluid in a range between 15 m/sec. and 50 m/sec.

In conventional practice, purge fluid is made to flow at a jet velocity in the order of 10 m/sec. to keep away dust. Taking note of various factors as above, this invention provides improvement by increasing the jet velocity to 15 m/sec. or higher, whereby the purge fluid serves not only to prevent entry of dust but to cool the valve stem 1. On the whole, the valve stem 1 and the tubular portions 3 of the valve housing 2 are protected from wearing action of dust, and furthermore the valve stem cooling efficiency is now considerably improved to check expansion and contraction by heat of the valve stem 1 and provide excellent sealing when the valve is completely closed.

It may be added that the jet velocity of the purge fluid is regulated by a control valve (not shown) mounted on the feed duct R1 where the purge fluid is generated by steam generating means (not shown) such as a boiler.

We claim:
1. A butterfly valve comprising:
   a valve housing (2) having first and second tubular portions (3,3);
   a valve stem (1) extending in said tubular portions (3,3) and carrying a valve closure member (6) rotatable in said valve housing (2);
   first and second gland packing portions (9,9) provided between said stem (1) and said first and second tubular portions (3,3) to prevent fluid leakage;
   first and second bearing portions (4,4) for said valve stem (1) provided outwardly of said gland packing portions (9,9) respectively, wherein each of said first and second gland packing portions (9,9) is divided axially of said valve stem (1) into two sections (9a,9b), and including a bearing member (10) is fitted between said valve stem (1) and said tubu- lar portion (3) at a position intermediate between said two sections (9a,9b); and an inlet duct (R1) penetrating each of said tubular portions (3,3) and a passage (R) provided between said valve stem (1) and each of said first and second tubular portions (3,3) to introduce purge fluid into said valve housing (2), said passage (R) being defined at least at a position adjacent to an inwardly opening end (28) of each of said tubular portions (3,3) by a collar (19) surrounding said valve stem (1) and a bush (20) fitted against an interior wall of said tubular portion (3);

said inlet duct (R1) including at least one perforation (21) defined in at least one of said tubular portions (3,3), and a purge ring (18) fitted in each of said tubular portions (3,3), said purge ring (18) having a peripheral groove (16) and a plurality of pores (17) defined circumferentially thereof to communicate with said peripheral groove (16) and said passage (R), said perforation (21) and said peripheral groove (16) being in communication and said pores (17) being staggered with said perforation (21).

2. A butterfly valve as claimed in claim 1 wherein each of said tubular portions (3,3) has a perforation (3a) and each of said bearing members (10) has inner and outer peripheral grooves (12,13) and at least one pore (14) communicating with said inner and outer grooves (12,13), said perforation (3a), said inner and outer grooves (12,13) and said pore (14) forming a duct (R2) for introducing grease to said bearing member (10) in contact with said stem (1) and said tubular portion (3).

3. A butterfly valve as claimed in claim 2 wherein said collar (19) surrounds said valve stem (1) with a space (L) therebetween and has one end thereof resting in a recess (24) defined on said valve closure member (6) and the other end thereof extending into said tubular portion (3).

4. A butterfly valve as claimed in claim 3 wherein said collar (19) is provided on a side defining said passage (R) with heat and wear resisting metal coating (27).

5. A butterfly valve as claimed in claim 4 wherein said bearing portions (4,4) comprise ball bearings and said bearing members (10,10) comprise metal bearings.

6. A butterfly valve as claimed in claim 5 wherein said bearing members (10,10) and said valve stem (1) have beads (11) at positions to contact each other.

7. A butterfly valve as claimed in claim 1 wherein said inlet duct (R1) for purge fluid includes a plurality of perforations (121) defined in said at least one of said tubular portions (3,3).

* * * * *